(12) United States Patent
Henke et al.

(10) Patent No.: US 7,715,041 B2
(45) Date of Patent: May 11, 2010

(54) METHOD FOR MANAGING DESIRED PRINT CONTENT OF A PRINT JOB

(75) Inventors: Jeffrey S. Henke, Oconomowoc, WI (US); Jeffrey D. Brekke, Waterford, WI (US)

(73) Assignee: Quad/Graphics, Inc., Sussex, WI (US)

( * ) Notice: Subject to any disclaimer, the term of this patent is extended or adjusted under 35 U.S.C. 154(b) by 1247 days.

(21) Appl. No.: 11/192,929

(22) Filed: Jul. 29, 2005

(65) Prior Publication Data
US 2007/0024907 A1    Feb. 1, 2007

(51) Int. Cl.
*G06K 15/00* (2006.01)
(52) U.S. Cl. .................. 358/1.18; 358/1.15
(58) Field of Classification Search ............ 358/1.13, 358/1.15, 1.18; 715/225
See application file for complete search history.

(56) References Cited

U.S. PATENT DOCUMENTS

| | | | |
|---|---|---|---|
| 5,857,209 A | 1/1999 | Shively | |
| 5,870,766 A | 2/1999 | Shively | |
| 5,963,968 A | 10/1999 | Warmus et al. | |
| 5,987,461 A | 11/1999 | Dreyer et al. | |
| 6,175,846 B1 | 1/2001 | Shively | |
| 6,205,452 B1 | 3/2001 | Warmus et al. | |
| 6,246,993 B1 | 6/2001 | Dreyer et al. | |
| 6,327,599 B1 | 12/2001 | Warmus et al. | |
| 6,332,149 B1 | 12/2001 | Warmus et al. | |
| 6,446,100 B1 | 9/2002 | Warmus et al. | |
| 6,611,348 B1 | 8/2003 | Chase et al. | |
| 6,611,349 B1 | 8/2003 | Vogt et al. | |
| 6,738,155 B1 | 5/2004 | Rosenlund et al. | |
| 6,844,940 B2 | 1/2005 | Warmus et al. | |
| 6,952,801 B2 | 10/2005 | Warmus et al. | |
| 7,184,168 B2 | 2/2007 | Beckman et al. | |
| 7,278,094 B1 | 10/2007 | Dreyer et al. | |
| 2002/0103826 A1 | 8/2002 | Kriho et al. | |
| 2004/0216046 A1 | 10/2004 | Warmus et al. | |
| 2005/0283720 A1 | 12/2005 | Warmus et al. | |
| 2005/0283721 A1 | 12/2005 | Warmus et al. | |
| 2005/0283722 A1 | 12/2005 | Warmus et al. | |
| 2006/0274356 A1* | 12/2006 | Bellagamba et al. | ....... 358/1.15 |
| 2007/0244916 A1 | 10/2007 | Dreyer et al. | |
| 2008/0154943 A1 | 6/2008 | Dreyer et al. | |

* cited by examiner

*Primary Examiner*—Mark K Zimmerman
*Assistant Examiner*—Lennin R Rodriguez
(74) *Attorney, Agent, or Firm*—Michael Best & Friedrich LLP

(57) ABSTRACT

A method for producing a content data file for a desired print job including a plurality of customized versions of a printable work includes the step of receiving an electronic template of the printable work including a common portion and a customizable portion. A form accessible via a network is developed to allow each of a plurality of users to associate a corresponding customized content with the customizable portion via the network. The corresponding customized content together with the template defines a corresponding customized version of the printable work. A desired number of copies is associated with each customized version of the printable work, and the customized versions of the printable work and the corresponding desired number of copies are aggregated to produce a content data file for the desired print job.

23 Claims, 10 Drawing Sheets

FIG. 9

User: John Smith         ACME CO.

Manage Distribution List

Add recipient:

Name_____
Address_____
City_____State_____
Zip_____

FIG. 10

User: John Smith         ACME CO.

|  | MODEL 1 ad | MODEL 2 ad |
|---|---|---|
| Recipient #1 | x |  |
| Recipient #2 |  | x |
| Recipient #3 |  | x |
| Recipient #4 | x |  |
| Recipient #5 |  | x |

METHOD FOR MANAGING DESIRED PRINT CONTENT OF A PRINT JOB

FIELD OF THE INVENTION

The present invention relates generally to a method for managing the desired print content of a print job that includes a plurality of customized versions of a printable work, and a method for printing the print job.

BACKGROUND

It is often desirable to produce customized versions of a printable work, including customized content often selected to be of interest to an intended recipient. Many printing methods are available to print copies of a work and each has advantages and disadvantages based in part on the number of copies required. For example, a press, such as a web offset or gravure printing press, requires the production of an imaged plate prior to the printing process. The imaged plate and other complexities of the press process add expense such that in general, a larger number of copies in a print job is required in order to make the plate based printing process advantageous on a price per copy basis when compared to a non-plate based printing process. Recently, the ability of printers to produce customized versions of a printable work using a printing press has expanded significantly with the introduction of such processes as demographic binding and post-press processes such as ink jet or laser printing to add additional content to a work printed on a press. However, managing the content of such a print job can be a difficult task especially when the desired print job includes a large number of customized versions and when the common content portion and customized content portion are printed using separate printing processes such as printing with a press and also printing with an ink jet or laser printer.

SUMMARY

It is often desirable that different entities be allowed to individually determine corresponding customized versions of a printable work. For example, allowing each entity to determine customized content, such as personal information about the different entities, may be advantageous from a marketing perspective because this information is supplied to potential consumers. In the case that different entities determine corresponding customized versions of a printable work, it becomes logistically difficult to insure that each entity has accurately entered and approved its corresponding customized content. Further, it may be advantageous to insure that the customized content meets certain requirements, such as conformance with a desired corporate brand or image, and this can also be difficult when there are many entities involved.

In one aspect, the invention provides a method for producing a content data file for a desired print job including a plurality of customized versions of a printable work. The method includes determining an electronic template of the printable work including a common portion and a customizable portion. A form accessible via a network is developed to allow each of a plurality of users to associate a corresponding customized content with the customizable portion. A corresponding customized content for the customizable portion is received from each of a plurality of users accessing the form via a network. The corresponding customized content together with the template define a corresponding customized version of the printable work. The customized versions of the printable work are aggregated to produce a content data file for the desired print job.

In another aspect, the invention provides a method for producing a content data file for a desired print job including a plurality of customized versions of a printable work, and includes receiving an electronic template of the printable work including a common portion and a customizable portion, and receiving parameters for authorized content of the customizable portion. A form is developed to allow each of a plurality of second authority level users to associate a corresponding customized content with the customizable portion and each of the plurality of second authority level users is allowed to access the form via a network. Corresponding customized content for the customizable portion is received via the network from each of the plurality of second authority level users accessing the form, the corresponding customized content together with the template defining a corresponding authorized customized version of the printable work if the received corresponding customized content is in accordance with the received parameters. The authorized customized versions of the printable work are aggregated to produce a content data file for the desired print job.

In another aspect, the invention provides a method for printing a print job including a plurality of customized versions of a printable work. The method includes receiving an electronic template of the printable work including a common portion and a customizable portion, and receiving parameters for authorized content of the customizable portion from a first authority level user. A form is developed to allow each of a plurality of second authority level users to associate corresponding customized content with the customizable portion. Each of the plurality of second authority level users is allowed to securely access the form via the Internet and corresponding customized content for the customizable portion is received via the Internet from each of the plurality of second authority level users accessing the form. The corresponding customized content together with the template define a corresponding authorized customized version of the printable work if the received corresponding customizable content is in accordance with the received parameters. A preview image of at least a customized portion of each authorized customized version is generated for approval. Approvals for the authorized customized versions are received prior to printing, and a desired number of copies is associated with each authorized customized version. The authorized customized versions and the corresponding numbers of copies are aggregated to produce a content data file for the desired print job, and the authorized customized versions are printed such that the common portions are printed by a first printing device during a first printing pass and the customized portions are printed by a second printing device during a second printing pass in accordance with the content data file.

Other aspects of the invention will become apparent by consideration of the detailed description and accompanying drawings.

BRIEF DESCRIPTION OF THE DRAWINGS

FIG. 9 illustrates a web page for managing a distribution list;

FIG. 10 illustrates a web page for determining different customized content for different intended recipients of the work;

DETAILED DESCRIPTION

Figure 1:
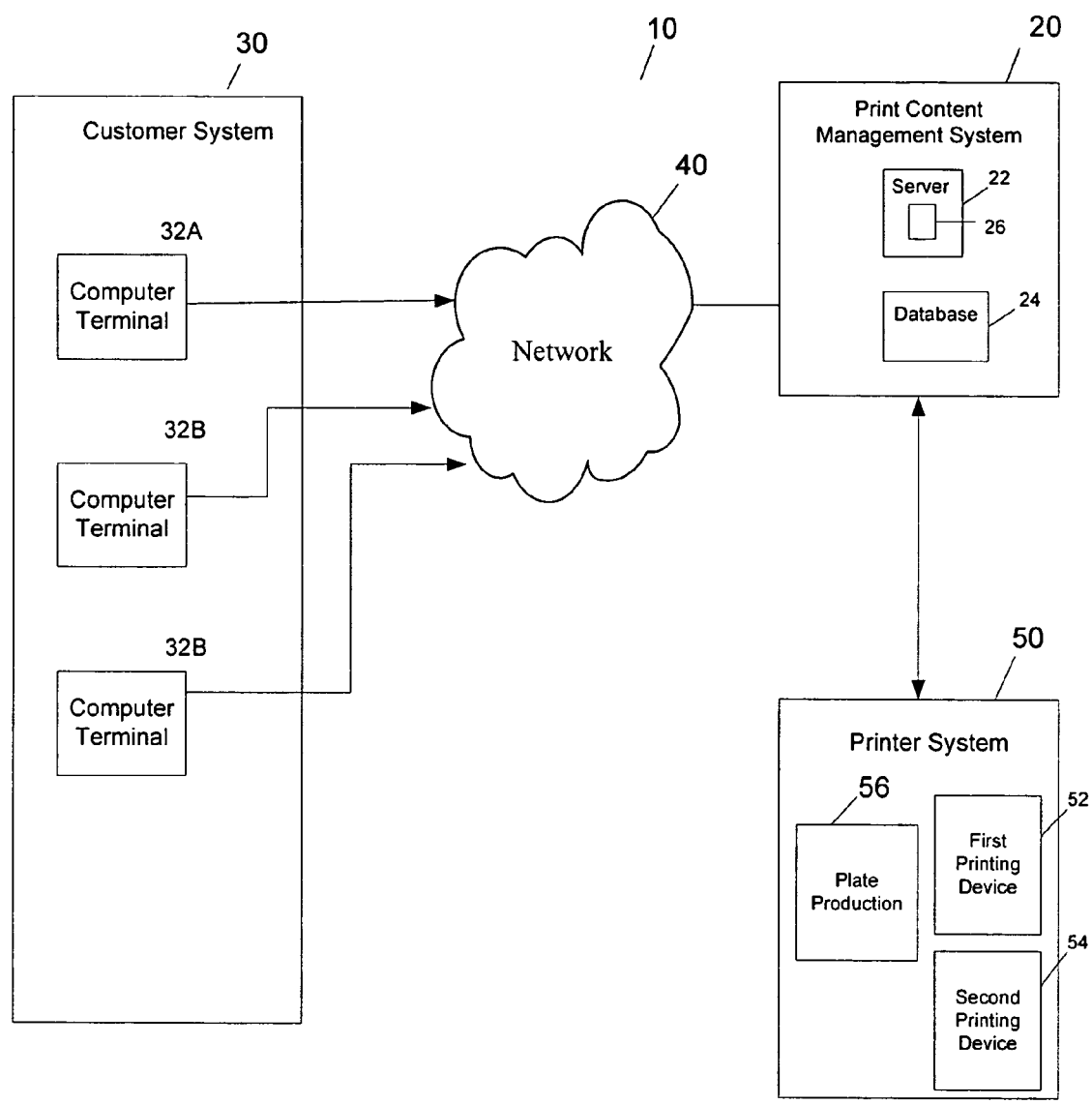
FIG. 1 is a schematic of a simplified system for implementing one embodiment of a method for producing a content data file for a desired print job.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

In addition, it should be understood that embodiments of the invention include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software. As such, it should be noted that a plurality of hardware and software based devices, as well as a plurality of different structural components may be utilized to implement the invention. Furthermore, and as described in subsequent paragraphs, the specific mechanical configurations illustrated in the drawings are intended to exemplify embodiments of the invention and that other alternative mechanical configurations are possible.

Illustrated in FIG. 1 is a simplified printing system 10 for printing a desired print job including a plurality of customized versions of a printable work. The printable work includes a common portion and a customizable portion that can be customized as further described below. In particular, system 10 includes a print content management system 20 connected to a customer system 30 via a network 40. The print content management system 20 is also connected to a printer system 50.

The print content management system 20 manages the print content of the desired print job for the customer and produces a content data file, preferably in a digital format, to be used in conjunction with printing the desired print job.

Once generated, the content data file for the print job can be communicated to the printer system 50, and one or more imaged plates can be produced by a plate production component 56. The desired print job can then be printed using two sequential printing processes. Specifically, the print job can be printed using a first printing device 52 for printing copies of the common portion of the printable work on a web such as paper and then using a second printer 54 for printing the customized portions on the web after the common portions have been printed. For example, the first printing device 52 can be a printing press using the imaged plates, and the second printing device can be a printer not having plates, such as an ink-jet or laser printer. Both printing processes can occur while the paper is in web form and later the pages can be separated and collated to produce individual customized versions of the work.

In a preferred embodiment, the network is the Internet, although the network can include other types of networks and/or sub-networks, including local area networks, wide area networks, public switched telephone networks, Intranets, or any other suitable networks.

Further, print content management system 20 includes a server 22 and a database 24 and can be managed by a service provider. The server 22 can include an operating system program 26 and one or more other software programs 26 that operate to communicate with the network 40 via digital data streams and operate to manage the print content of a desired print job. The server can be a transmission control protocol (TCP) server that transmits and receives digital data between the database 24 and the network 40. The database 24 stores data and information related to the digital print content of a desired print job. As more fully explained below, the print content management system 20 implements a customer specific web site that is accessible to designated users, with these users typically being designated by the customer.

The customer system 30 includes a plurality of computer terminals 32A, 32B, each including hardware such as a processor, I/O interfaces, and memory; and software such as an operation system, a display application, a communications application, and other software as necessary or desired. In particular, each computer terminal is preferably equipped with a communications interface such as a web browser for accessing web sites on the Internet. The customer system 30 can also include other components such as a sub-network, a server or a database. The computers 32A, 32B can be remote from the print content management system 20 and/or remote from each other.

In one embodiment, the users can access the web site via the Internet from the computer terminals in order to select or input corresponding customized content for the customizable portion of the printable work. In this manner, a user can be remote from the print content management system 20, and the print content management system 20 rather than the customer system 30 keeps track of the many customized versions of a printable work making up a particular print job.

In one embodiment, the customer system 30 includes computer terminal 32A operated by a first authority level user, and computer terminals 32B each operated by a second authority level user. For example, the first authority level user may be a user looking out for the general interests of the customer, where the customer is a company. Further, the plurality of second authority level users may be the dealers, licensees, franchisees, employees or representatives of the company. The customer or company would like to provide a printable work to be distributed to potential consumers of its goods or services and would like to provide its dealers or representatives, the second authority level users, with the opportunity to add customized content to the printable work, and perhaps manage a distribution list of intended recipients of the printable work. However, the company might also like to retain ultimate authority over the customized content added and the format of the entire printable work. For example, the company may want to ensure consistent usage of brand materials including trademarks, trade names or the like, may want to dictate the font types and colors of customized information, may want to ensure consistent pricing of goods or services, or may want to insure that information or material present in the printable work conforms to certain regulations. For these and other reasons, it may be desirable to ensure that the digital content data file contains only validated or authorized customized versions of a printable work, and that only these authorized versions will actually be printed and distributed.

Figure 2A:
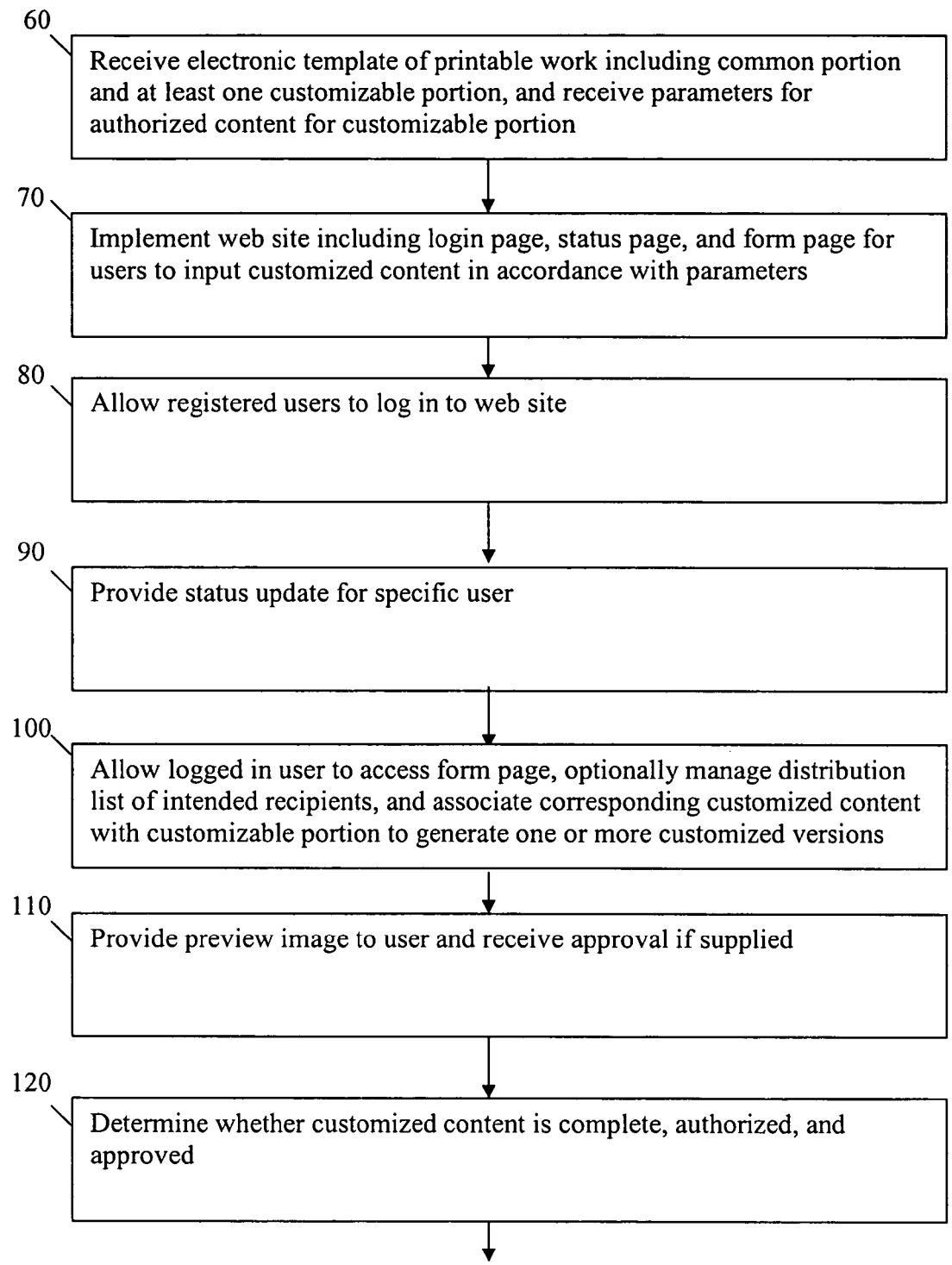
FIGS. 2(a)-(b) are a block diagram of one embodiment of a method for producing a content data file for a desired print job.

FIGS. 2(a) and (b) illustrate one embodiment of a method for managing the print content of a desired print job including a plurality of customized versions of a printable work and generating a content data file for the desired print job. In particular, at step 60, the print content management system 20 determines an electronic template of the printable work, wherein the printable work includes a common portion and at least one customizable portion. Optionally, various parameters for authorized content for the customizable portion of the printable work are also determined.

Typically, the template of the printable work is received by the print content management system 20 in an electronic format from the customer, in one embodiment from the first authority level user, either via the network or another way such as on disk. Certainly the template can also be developed for the customer by a publisher or other entity as well acting for the customer. For example, the desired printable work may be the customer's magazine or promotional piece. The customer (directly or indirectly through another) can provide images and data of desired content for the magazine using slides or computer files to create one or more electronic "pages" which describe the content and layout of desired pages of the printable work. Sample pages for a desired printable work are schematically illustrated in FIG. 3. In this example, the desired printable work is a company's magazine, is intended to be eight pages, and includes one or more customizable portions such as customizable portion 102 shown in FIG. 3(c), a customizable portion 104 shown in FIG. 3(g), and a customizable portion 106 shown in FIG. 3(h).

Figure 4A:
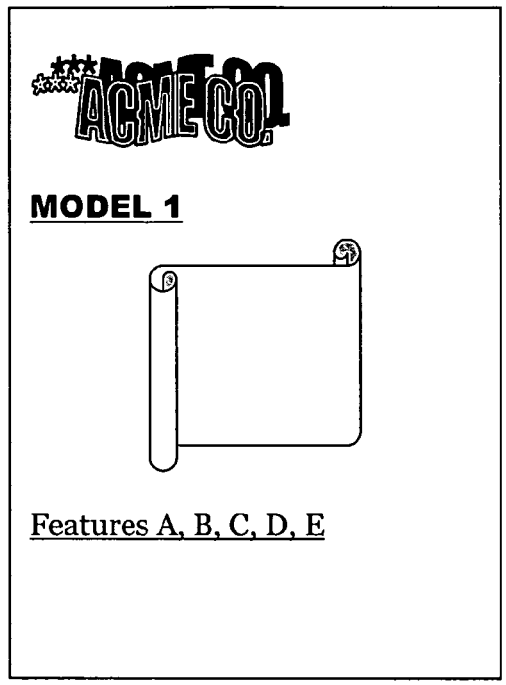
FIGS. 4(a)-(b) illustrate an example of authorized options for one of the customizable portions of the printable work shown in FIGS. 3(a)-(h)
Figure 4B:
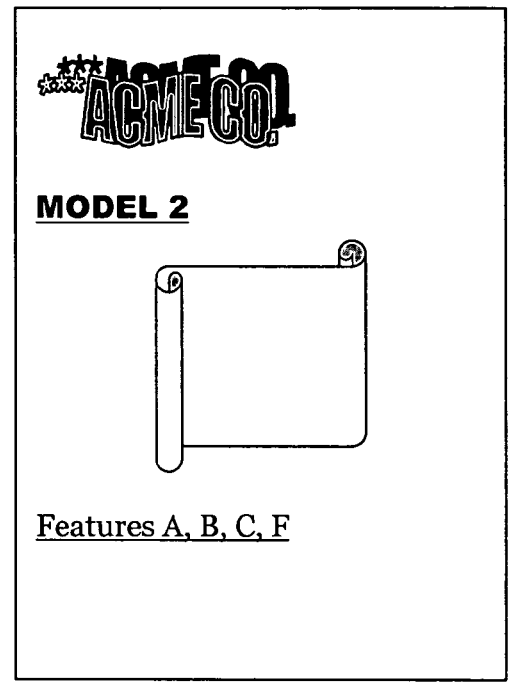

As more fully described below, various parameters defining authorized content for the customizable portion can be imposed by the customer and implemented by the service provider. This insures that a customized version of the printable work includes only authorized content that is authorized by the company, in one embodiment a first authority level user. In one example, the company may desire that, for the customizable portion 102, the second authority level users each be allowed to select one from among two or more provided options to include as customized content in a corresponding customized version. For example, the provided options may include a first advertisement, such as illustrated in FIG. 4(a), and a second advertisement, such as illustrated in FIG. 4(b). These permitted options would also preferably be provided to the print content management system 20 as electronic files.

Figure 2B:
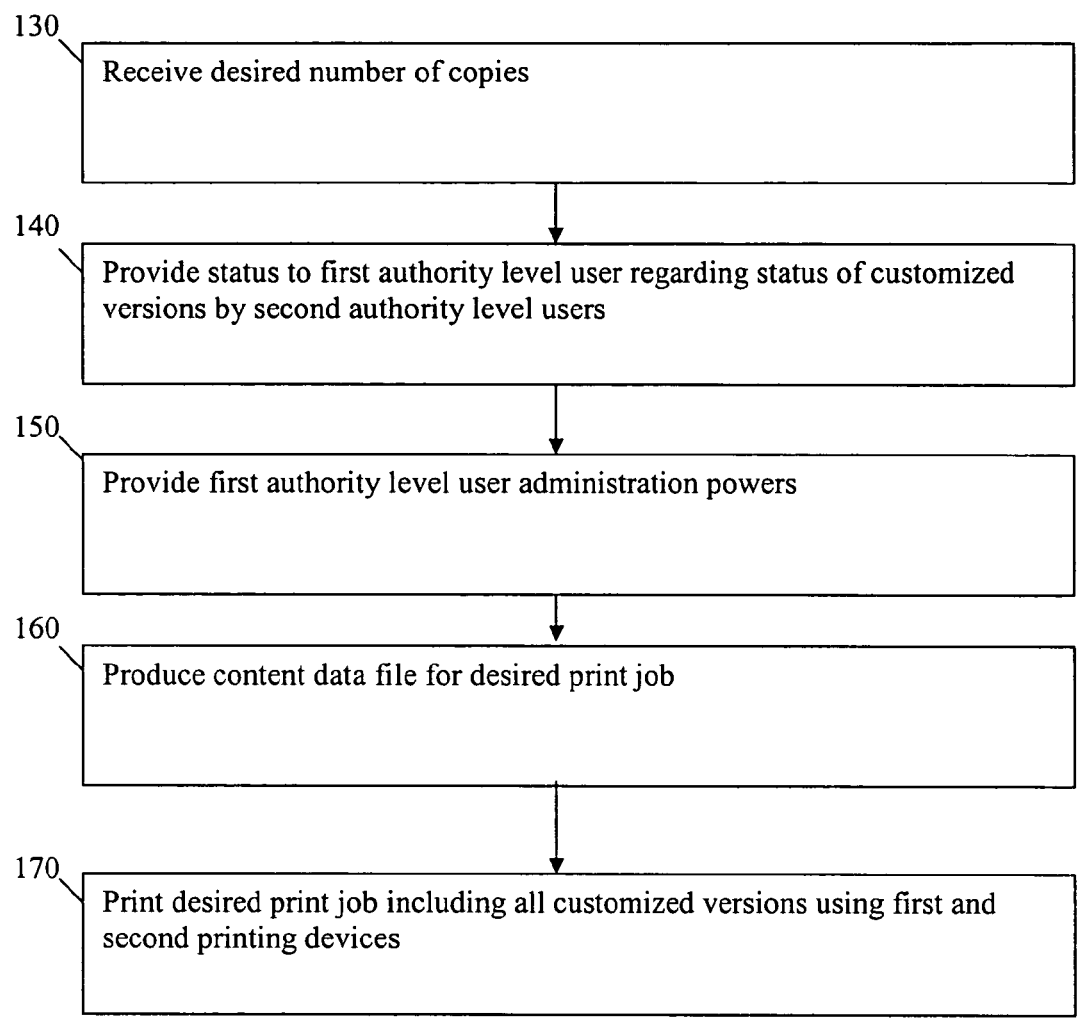
Figure 3A:
FIGS. 3(a)-(h) illustrate an example of a printable work including customizable portions.
Figure 3B:
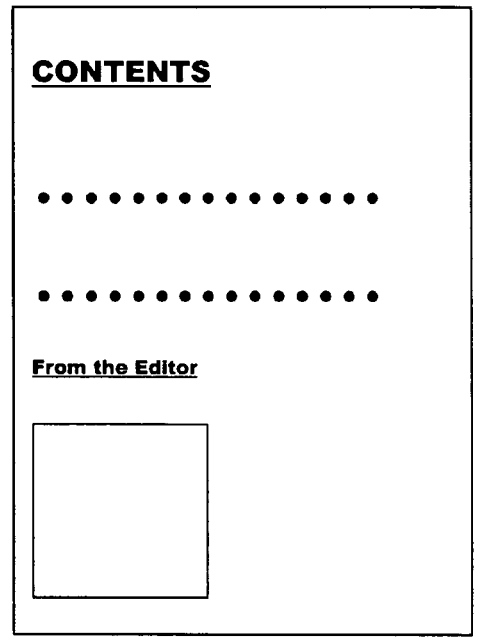
Figure 3C:
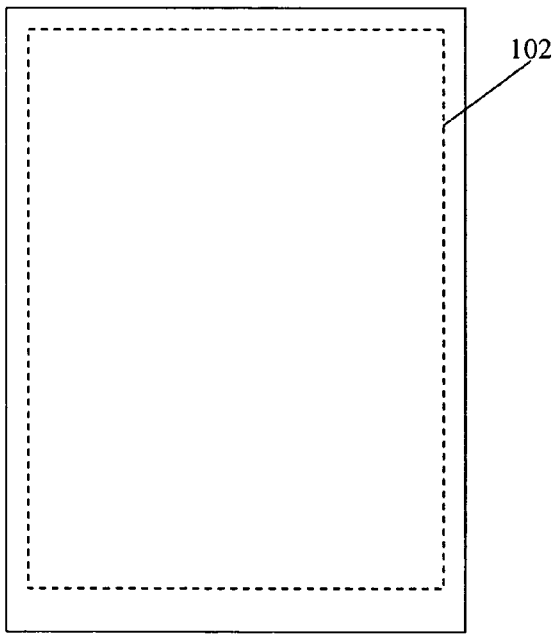
Figure 3D:
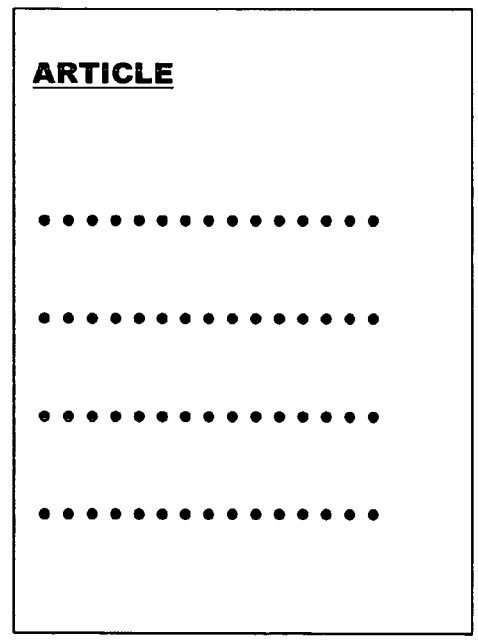
Figure 3E:
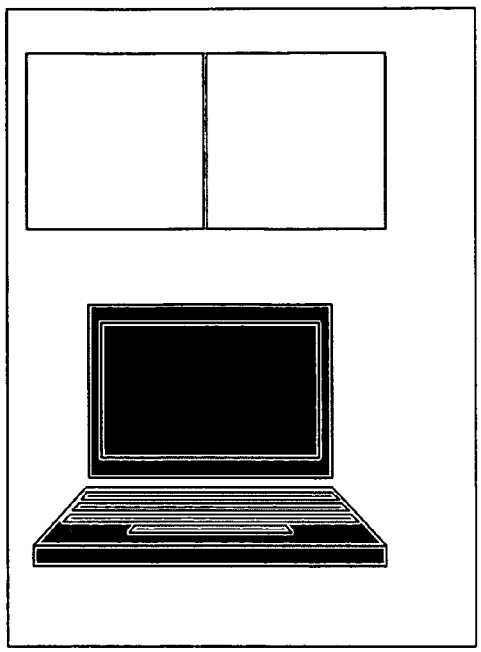
Figure 3F:
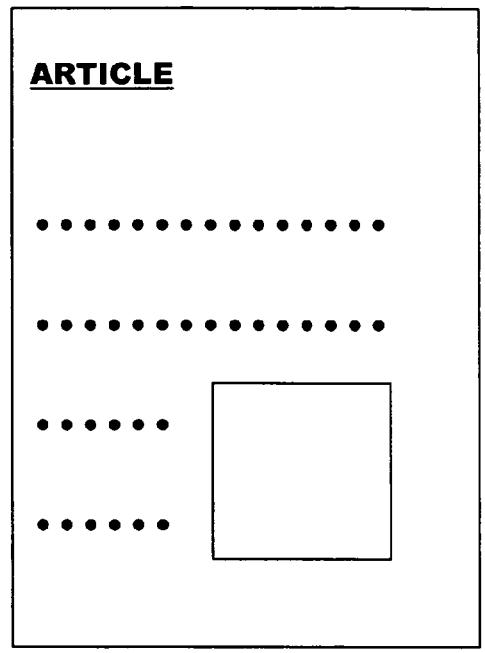
Figure 3G:
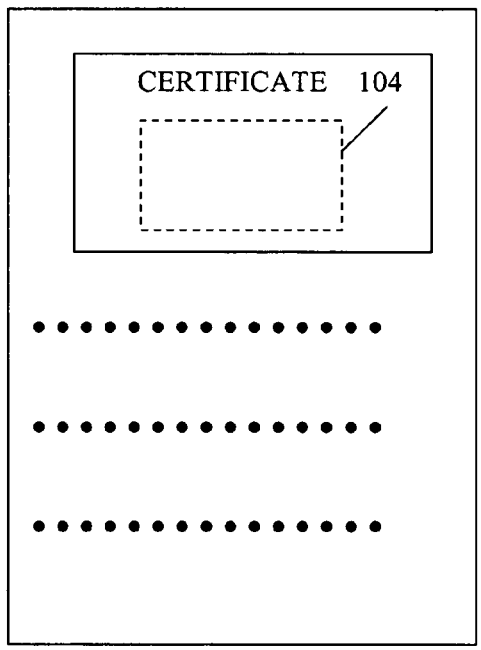
Figure 3H:
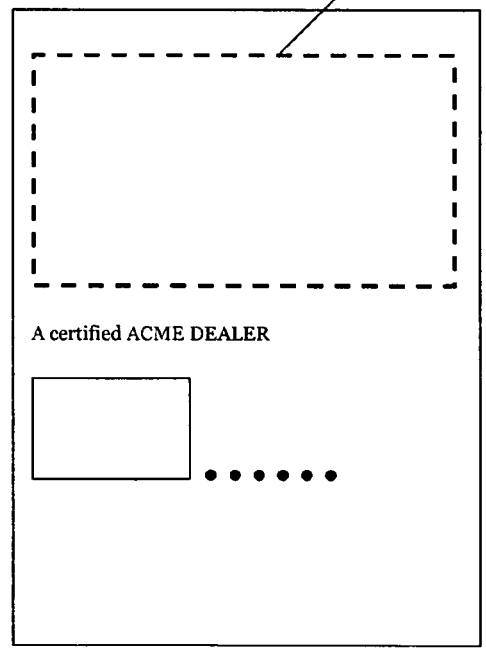

Referring again to FIG. 2, at step 70, a web site is implemented by the service provider to allow users to create customized versions of the printable work by accessing the web site at a predetermined network address. The web site can include various pages such as a login page, a status page, and a form for allowing each of a plurality of users to associate a corresponding customized content with each customizable portion of the printable work. The web site can also include various pages accessible to administrators to provide status updates regarding the various users.

The login page can allow registered users access to the other pages of the web site and the status page can provide users with information regarding the status of a specific printable work and any other printable works that may need to be customized. The form can be stored in the database, and can be accessed by a logged in user accessing the web site at the particular network address. The created pages can include company information and trademarks such that the company appears to sponsor the web site.

Figure 5:
FIG. 5 illustrates a status page of an implemented web site.

Once the web site is implemented, at step 80, registered users who access the web site at the network address are each allowed to log in to the web site, such as by entering a username and password. Once logged in, at step 90, the system 20 can provide to the user a status update. One example of a web site status page is illustrated in FIG. 5. In some cases, the company may want to print an issue of its magazine at pre-specified intervals and each issue may require customization. In this example, the company produces a magazine issue every other month and the print content management system 20 can determine and keep track of a plurality of customized versions for each issue. Status information can be provided for each printable work, such as whether or not customized content has been received or approved.

Figure 6:
FIGS. 6-8 illustrate various forms on respective web pages of the implemented web site for determining customized content for corresponding customizable portions.
Figure 7:
Figure 8:

At step 100, a logged in user is allowed to access the form, optionally manage a distribution list of intended recipients, and associate corresponding customized content with the customizable portion or portions to generate one or more customized versions. FIGS. 6-8 include examples of form pages as viewed on the computer terminal 32B of a user. The form pages can take a variety of forms and are created taking into account any parameters imposed on the customized content. FIG. 6 illustrates a form that can be created in response to the parameters imposed on the content of customizable portion 102. In this case, a user simple selects one of the titled options to determine corresponding customized content for portion 102, but in other cases, thumbnail sketches of the advertisements could also be displayed such that a user has a better idea of the actual content of the available options.

FIG. 7 illustrates a form created in response to a parameter limiting the dollar values in the customizable portion 104 of the printable work to specific pre-determined increments, and a parameter limiting the models for which the certificate can be used. For example, the company may desire that any savings in the certificate reflect specific specified increments, such as $100 increments, implement a maximum savings amount, and/or desire that any savings be limited to specified models or services. The user can input selections or data on this form and these selections or data comprise the user's corresponding customized content and are transmitted to the print content management system 20.

As another example, with reference to the form illustrated in FIG. 8, a user is allowed to input a dealer name, address, and store hours, and perhaps a photo of the dealer or dealership. This information is transmitted to the print content management system 20.

Once the customized content for each customizable portion has been received, the customized content and the template together define a customized version of the printable work. For example, in the template, the company may specify font type, size, and placement of any inserted content and/or additional content to be added to the customizable version based on what is input by the user. In this manner, the company can retain ultimate authority over the printable work but can allow for some content choices to be made by a user. The use of a customizable portion allows for many possibilities regarding customized content.

As shown in FIG. 9, the web site may also provide pages for users to manage a distribution list of intended recipients, such as by entering or updating names and addresses of the intended recipients of the printed work. In other cases, recipients can be determined by the customer or can be determined by obtaining lists from a list source. Then, when printing the print job, the names and address of intended recipients can also be respectively printed by the second printing device.

Another optional feature that can be implemented by the system 10 includes allowing the users to determine different customized versions for different recipients, using a web page such as shown in FIG. 10 to input various selections.

At step 110, a preview image of at least the customized portion of the determined customized version can be generated and provided to the corresponding user. In one embodiment, the preview image is sent in PDF format via e-mail. The preview image includes the selected or input customized content in the template. In this manner, a user is allowed to view the customized version of the printable work as it will be printed and insure that the correct and accurate content is included. The user can then input approval of any customized versions via the status page or via another page on the web site and the print content management system 20 receives this approval if supplied. Because the implemented web site makes it easy for users to determine and approve of authorized customized content, any desired changes can be easily made. The web site can also include information regarding an imposed deadline after which changes will not be accepted.

At step 120, the print content management system 20 can determine whether the customized content is complete, authorized, and approved for each customized version.

Figure 12:
FIG. 12 illustrates a web page for inputting a desired number of copies for different customized versions of the printable work.

At step 130, a desired number of copies for each customized version can be determined. For example, this information can be provided by the first authority level user, the second authority level user, or can be a predetermined amount. FIG. 12 illustrates a web page wherein an administrator is provided authority to supply a desired number of copies to be associated with each customized version prepared by various dealers. This feature can be advantageous especially in a situation where each dealer (second authority level users) has varying distribution needs and/or when a company and its dealers want to equitably divide the costs of the print job.

Figure 11:
FIG. 11 illustrates a web page for an administrator to view status of the users of system 20.

At step 140, a status page can be provided to a first authority level user regarding the status of the customized versions determined by the second authority level users. FIG. 11 illustrates a web page wherein an administrator, or first authority level user views the status of its dealers, or second authority level users, with respect to various printable works. Further at step 150, the first authority level users can also be provided with administration powers on the web to perform certain tasks related to the desired print job as desired. For example, these powers may include selecting or providing customized content for second authority level users who have not done so, managing distribution lists, and providing approval for users who have not provided approval.

Once it is determined that the each customized version is complete, authorized and approved and corresponding numbers of copies are determined, at step 160, a content data file can be produced for the desired print job. At step 170, the desired print job can be printed. Specifically, the print job including all the customized versions can be printed using first and second printing devices, as described above.

The content data file is advantageous because the print order of the copies of the printable work can be manipulated such that the second printing device prints the names and addresses of the intended recipients in zip code order or in another form so as to take advantage of postal discounts or the like.

Various features and advantages of the invention are set forth in the following claims.

What is claimed is:

1. A method for producing a content data file for a desired print job including customized versions of a printable work, the method comprising:

determining an electronic template of the printable work including a common portion and a customizable portion, providing a form accessible via a network to allow each of a plurality of users to associate a corresponding customized content with the customizable portion, receiving from each of a plurality of users accessing the form via a network corresponding customized content for the customizable portion, the corresponding customized content together with the template defining a corresponding customized version of the printable work, aggregating the customized versions of the printable work to produce a content data file for the desired print job, and printing the desired print job in accordance with the content data file by printing the common portions of the customized versions by a first printing device during a first printing pass and the customized portions of the customized versions by a second printing device during a second printing pass.

2. The method of claim 1, further comprising generating a preview image of at least the customized portion of a customized version, allowing the corresponding user to send an approval for the customized version after viewing the preview image, and requiring approvals from the users prior to producing the content data file for the desired print job.

3. The method of claim 2, further comprising sending the preview image to the corresponding user via e-mail.

4. The method of claim 2, further comprising receiving the approvals via the network.

5. The method of claim 1, wherein the first printing device comprises an imaged plate and the second printing device does not have an imaged plate.

6. The method of claim 1, further comprising permitting each user to manage a corresponding distribution list of intended recipients.

7. The method of claim 1, further comprising permitting each user to manage a corresponding distribution list for intended recipients, and permitting each user to determine different customized versions for different recipients.

8. A method for producing a content data file for a desired print job, the method comprising:

receiving an electronic template of a printable work including a common portion and a customizable portion, and receiving parameters for authorized content of the customizable portion from a first authority level user, providing a form to allow each of a plurality of second authority level users to associate a corresponding customized content with the customizable portion, allowing each of the plurality of second authority level users to access the form via a network, receiving via the network from each of the plurality of second authority level users accessing the form corresponding customized content for the customizable portion, the corresponding customized content together with the template defining a corresponding authorized customized version of the printable work in accordance with the received parameters, producing a content data file for the desired print job based upon the authorized customized versions of the printable work, and printing the desired print job in accordance with the content data file by printing the common portions of the customized versions by a first printing device and printing the customized portions of the customized versions by a second printing device.

9. The method of claim 8, further comprising generating a preview image of at least a customized portion of each authorized customized version, transmitting the preview image to the corresponding second authority level user for approval, allowing the corresponding second authority level user to transmit an approval for the authorized customized version, and requiring approvals from the second authority level users prior to producing the content data file for the desired print job.

10. The method of claim 9, further comprising sending the preview image to the corresponding second authority level user via e-mail.

11. The method of claim 10, further comprising receiving the approvals via the network.

12. The method of claim 8, wherein the first printing device prints during a first printing pass, and the second printing device prints during a second printing pass.

13. The method of claim 12, wherein the first printing device comprises an imaged plate and the second printing device does not have an imaged plate.

14. The method of claim 8, further comprising permitting a user to remotely manage a corresponding distribution list of intended recipients.

15. The method of claim 8, further comprising permitting each second authority level user to remotely manage a corresponding distribution list for intended recipients, and permitting each second authority level user to determine different customized versions for different recipients.

16. The method of claim 8, further comprising receiving a plurality of predetermined content options from the first authority level user and allowing the second authority level user to chose from the predetermined content options to generate the corresponding customized content.

17. The method of claim 8, wherein producing the content data file for the desired print job comprises aggregating the authorized customized versions of the printable work.

18. A method for printing a print job comprising a plurality of customized versions of a printable work, the method comprising:

receiving from a first authority level user an electronic template of the printable work including a common portion and a customizable portion, and receiving parameters for authorized content of the customizable portion, providing a form to allow each of a plurality of second authority level users to associate corresponding customized content with the customizable portion, allowing each of the plurality of second authority level users to securely access the form via a network, receiving via the network from each of the plurality of second authority level users accessing the form corresponding customized content for the customizable portion, the corresponding customized content together with the template defining a corresponding authorized customized version of the printable work if the received corresponding customizable content is in accordance with the received parameters, generating a preview image of at least a customized portion of each authorized customized version for approval, receiving approvals for the authorized customized versions prior to printing, associating a desired number of copies with each authorized customized version, aggregating the authorized customized versions and the corresponding numbers of copies to produce a content data file for the desired print job, and printing the authorized customized versions such that the common portions are printed by a first printing device during a first printing pass and the customized portions are printed by a second printing device during a second printing pass in accordance with the content data file.

19. The method of claim 18, wherein the first printing device is a web offset press and the second printing device is a different printing device.

20. The method of claim 18, further comprising transmitting the preview image to the corresponding second authority level user for approval prior to printing.

21. The method of claim 20, wherein transmitting the preview image is achieved by sending the preview image via e-mail.

22. The method of claim 18, further comprising permitting each second authority level user to remotely manage a corresponding distribution list of intended recipients.

23. The method of claim 18, further comprising permitting each remote second authority level user to remotely manage a corresponding distribution list for intended recipients, and permitting each remote second authority level user to determine different customized versions for different recipients.

* * * * *